United States Patent [19]

Janner et al.

[11] 4,289,592
[45] Sep. 15, 1981

[54] METHOD OF SEPARATING ISOTOPE COMPOUNDS BY SELECTIVE EXCITATION AND REACTION IN A SOLID MATRIX

[75] Inventors: Karl Janner; Klaus Gregorius; Reinhold Müller, all of Erlangen, Fed. Rep. of Germany

[73] Assignee: Kraftwerk Union Aktiengesellschaft, Mulheim an der Ruhr, Fed. Rep. of Germany

[21] Appl. No.: 895,510

[22] Filed: Apr. 11, 1978

[30] Foreign Application Priority Data

Apr. 22, 1977 [DE] Fed. Rep. of Germany ....... 2718030

[51] Int. Cl.³ ............................................ B01D 59/34
[52] U.S. Cl. ............................. 204/157.1 R; 250/527
[58] Field of Search ................. 204/157.1 R; 250/527, 250/423 P

[56] References Cited

U.S. PATENT DOCUMENTS

| | | | |
|---|---|---|---|
| 3,740,552 | 6/1973 | Pressman | 250/423 P |
| 3,772,519 | 11/1973 | Levy et al. | 250/423P |
| 4,025,790 | 5/1977 | Jetter et al. | 250/423 P |
| 4,032,419 | 6/1977 | Bernstein | 204/157.1 R |
| 4,166,951 | 9/1979 | Garbuny | 250/423 P |
| 4,220,510 | 9/1980 | Brueck et al. | 204/157.1 R |

FOREIGN PATENT DOCUMENTS 2806162  8/1978  Fed. Rep. of Germany ... 423/259 X

OTHER PUBLICATIONS

Jensen, R. J. et al., "Prospects for Uranium Enrichment," *Laser Focus*, May 1976, pp. 51, 52, 59-63.
Robinson, A. L., "Infrared Photochemistry (II): Multiphoton Isotope Separation," *Science*, 194: 45-48, Oct. 1976.
Paine, R. T. et al., "Vibrational Spectroscopy of Matrix-Isolated $UF_6$ and $UF_5$," *J. Chem. Phys.*, 64(7): 3081-3083, Apr. 1976.

*Primary Examiner*—Richard E. Schafer
*Attorney, Agent, or Firm*—Herbert L. Lerner

[57] ABSTRACT

Separation of an isotope substance from a vaporous mixture of isotope substances such as $UF_6$, by selective excitation of low temperature of one isotope compound by electromagnetic radiation to effect chemical reaction of the excited isotope compound with a reaction partner. Separate bodies of the vaporous mixture of isotope compounds and the reaction partner are cooled by adiabatic expansion to a temperature below 100 K. The cooled vapors are mixed in a chamber where the reaction partner is condensed to form solid matter into which isotope compounds are incorporated. The solid matter with or without compacting is subjected to radiation to excite one isotope compound and react it with the reaction product to produce a reaction product which contains predominently the one isotope.

8 Claims, 3 Drawing Figures

METHOD OF SEPARATING ISOTOPE COMPOUNDS BY SELECTIVE EXCITATION AND REACTION IN A SOLID MATRIX

BACKGROUND OF THE INVENTION

1. Field of the Invention

This invention relates to a method and apparatus for the separation of an isotope substance from a vaporous mixture of isotope substances by selective excitation at low temperature of one isotope compound to effect chemical reaction with a reaction partner.

2. Description of the Prior Art

Separating originally vaporous mixtures of substances, especially isotope compounds, utilizing selective excitation, possible at very low temperatures, of one isotope compound by electromagnetic radiation of appropriate wavelength and energy density, and the supply of a reaction partner with which the excited compound enters into a chemical reaction is known. Such a method is described, for instance, in the German Published Non-Prosecuted application No. 2 447 762, according to which the mixture of substances is mixed with a reaction partner, is adiabatically expanded together with the latter, and is excited before being condensed in an isotopeselective manner by the laser radiation of suitable wavelength. For good utilization of the radiation, as is described for reasons of economy, the isotope compound to be excited should have an absorption coefficient as high as possible with respect to the laser radiation. This means that the effectiveness of isotope separation according to this method depends on the availability of a laser wavelength, at which the absorption of the isotope compound is highly selective, as well as on a sufficiently high absorption coefficient of the isotope compound at this wavelength.

SUMMARY OF THE INVENTION

An object of the present invention is to provide a method and apparatus for separation of an isotope substance from a vaporous mixture by irradiation at low temperature with high absorption of radiation.

With the foregoing and other objects in view, there is provided in accordance with the invention a method for the separation of an isotope substance from a vaporous mixture of isotope substances, by selective excitation at low temperatures of one isotope compound by electromagnetic radiation having a wavelength and energy density to effect a chemical reaction between the excited one isotope compound and an added reaction partner to produce a reaction product the improvement including:

(a) adiabatically expanding a body of the vaporous mixture of isotope compounds separate from the vaporous reaction partner to cool the mixture of isotope compounds to a temperature below 100K., (b) adiabatically expanding a body of vaporous reaction partner in excess of that required for reaction with the excited isotope compound, separate from the vaporous mixture of isotope compounds to cool the vaporous reaction partner to a temperature below 100K., (c) mixing the cooled mixture of isotope compounds and the cooled reaction partner together in a zone at a temperature below 100K., (d) condensing the reaction partner in the zone to form particles of solid matter, into which particles of the mixture of isotope compounds are incorporated, (e) subjecting the solid matter of reaction partner and mixture of isotope compounds to electromagnetic radiation to selectively excite the one isotope compound and effect selective reaction of the excited isotope compound with the condensed reaction partner to produce a reaction product which contains predominantly the one isotope, and (f) separating a compound of the one isotope from the reaction mixture.

There is provided in accordance with the invention an apparatus for the separation of an isotope substance from a vaporous mixture of isotope substances by selective excitation at low temperature of one isotope compound by electromagnetic radiation having a wavelength and energy density to effect a chemical reaction between the excited one isotope compound and an added reaction partner to produce a reaction product including a separate supply tank containing the vaporous mixture of isotope substances, a second separate supply tank containing the reaction partner, an expansion chamber, a nozzle arranged in the wall of the expansion chamber and connected to the first supply tank to permit flow of isotope substances from the first supply tank through the first nozzle into the expansion chamber, a second nozzle arranged in the wall of the expansion chamber and connected to the second supply tank to permit flow of reaction partner from the second supply tank through the second nozzle into the expansion chamber, revolving cooled cylinders disposed in the expansion chamber to condense and form on the cylinders a layer of solid matter of reaction partner and mixture of isotope compounds, an irradiation device disposed to irradiate the layer of solid matter, a peeling knife to remove the irradiated layer from the cylinder, and a collecting vessel for receiving the peeled irradiated layer.

In accordance with another embodiment of the invention there is provided apparatus for the separation of an isotope substance from a vaporous mixture of isotope substances by selective excitation at low temperature of one isotope compound by electromagnetic radiation having a wavelength and energy density to effect a chemical reaction between the excited one isotope compound and an added reaction partner to produce a reaction product including a separate supply tank containing the vaporous mixture of isotope substances, a second separate supply tank containing the reaction partner, a wheel rotatably supported in bearings, a first nozzle and a second nozzle mounted on the periphery of the wheel with vapor from the first supply tank flowing through the first nozzle and vapor from the second supply tank flowing through the second nozzle driving the wheel, a collecting wall of approximately U-shaped cross section surrounding the wheel, a rotatable knife-like device contoured to the interior of the collecting wall for removing solid matter deposited on the wall, an opening in the collecting wall for discharge of removed solid matter, and an irradiation chamber with a laser device for receiving the discharged solid matter.

Other features which are considered as characteristic for the invention are set forth in the appended claims.

Although the invention is illustrated and described herein as embodied in a method of separating isotope compounds, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
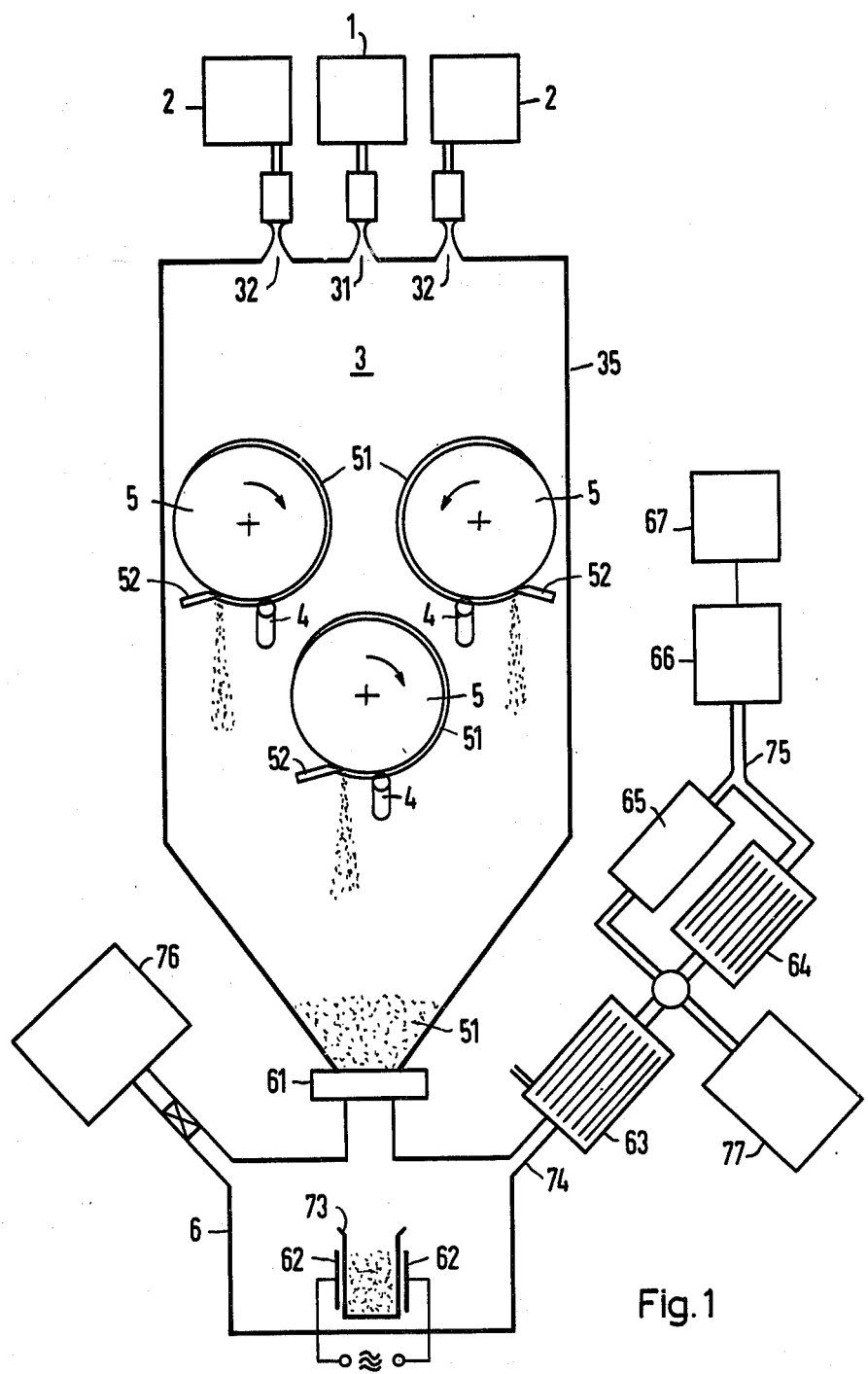
FIG. 1 diagrammatically shows apparatus for carrying out the method of the present invention.

In accordance with the invention, the vaporous isotope mixture as well as the reaction partner, which is initially likewise vaporous and is supplied in an amount in excess of that required to react with the excited isotope compound in the vaporous isotope mixture, are separately expanded adiabatically to below 100K. and are mixed together in a space cooled down to approximately the same temperature. The reaction partner is condensed in the gas space or at cooled surfaces in the form of solid particles, into which the particles of the mixture of isotope substances are incorporated. This solid material containing both the reaction partner and the isotope mixture is subjected to electromagnetic radiation which selectively excites the one isotope compound, which selectively reacts with the condensed reaction partner, to produce thereby, a reaction produce which contains predominantly the one isotope. This reaction produce may be dissolved-out or separated from the compound mass or reaction mass or mixture by known methods e.g. by chemical processes or fractional distillation. An important feature as compared to the state of the art mentioned at the outset is that the isotope mixture and the reaction partner are mixed by separate adiabatic expansion at so low a temperature that in the absence of irradiation, practically no reaction occurs, and further, that only a mixture of substances of reaction partner and isotope mixture in the solid state is subjected to the laser radiation. This makes it possible to irradiate when the isotope compound to be excited has a very small extinct coefficient, as the mixture of material present in the solid state is very dense when compared to the mixture in the vaporous state; so that overall, one can still work with high absorption of the light quanta and therefore, can count on a high selective excitation probability. In the use of $UF_6$, as the uranium isotope compound, the visible $UF_6$ spectrum can therefore lie in the wavelength range 310 nm $\leq \lambda \leq$ 410 nm at the points with sufficient selectivity but small extinction, and combination vibrations in the infrared range with small extinction such as, for instance, $3\nu_3$, can be utilized.

The cycle of the process is in principle the following:

$UF_6$ is chosen as an example for the isotope compound to be separated. This compound and the reaction partner are cooled down separately from each other by adiabatic expansion in nozzles. The cooling is carried to an extent that on the one hand, practically no mutual reactions occur in the subsequent mixing and, on the other hand, at least one gas, for instance, the reaction partner, is supersaturated or is condensed at a sufficiently cold wall. The $UF_6$ is expanded, together with a supplemental gas which increases the adiabatic coefficient, in one central nozzle and the reaction partner, in another nozzle, for instance, in a ring or slit nozzle surrounding the first one. The expansion characteristic of the two nozzles are chosen so that the relative velocities between these two gas streams immediately preceding the mixing are as small as possible. The gas streams are furthermore conducted in a mixing chamber until complete mixing as well as subsequent condensation, i.e., formation of crystals, has occurred, unless the condensation takes place predominantly at a wall. In this process, the $UF_6$ is incorporated into or attached to the matrix of the condensing reaction partner. The amount of supplemental gas which is also incorporated must be kept small so that the selectivity is not unduly disturbed and the intended photo reactions between the $UF_6$ and the reaction partner are not impeded. Suitable for this purpose is, for instance, helium, as it is not easily incorporated. Other known gases suitable for increasing the adiabatic coefficient may be employed.

The crystals of solid matter prepared in this manner are irradiated in the range of the resonance frequency of the isotope to be separated at a point of sufficient selectivity, so that photo reactions take place between these molecules and elements of the reaction partner. In order to achieve maximum effectiveness of the irradiation, including uniform coverage, as far as possible, of the entire crystal substance produced, the crystals can be compacted by filling, prior to the irradiation, into forms or by pressing into molded bodies such that the scattered or reflected radiation again strikes the substance to be irradiated.

The separation of the enriched component from the other components in the reaction mass may be accomplished by fractional distillation. This process, too, is carried out at temperatures so low that non-selective thermal reactions have no detrimental effect. This process step will advantageously occur in vacuum separated chambers. An easily controlled capacitive high-frequency treatment is provided for setting the temperature of the crystal powder, which is necessary for accurately maintaining the distillation conditions. Compared with other thermal control systems, this treatment makes it possible to bring the heat practically uniformly into the entire volume of the crystal powder or the molded body.

Figure 2:
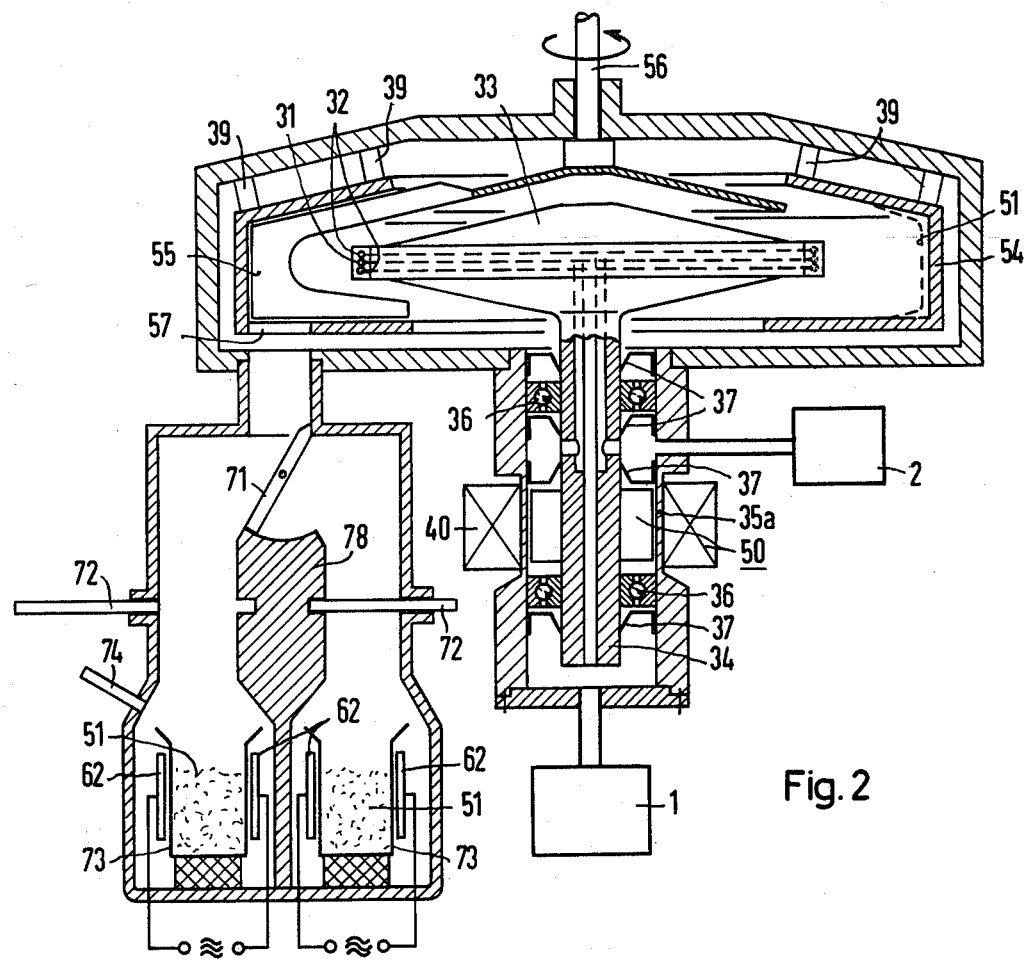
FIG. 2 shows another form of apparatus to effect reduction in refrigeration requirement.

To explain the method in greater detail, reference is made to FIGS. 1 and 2. Corresponding components are provided with the same reference symbols.

The apparatus in FIG. 1 consists, first of all, of the supply tank 1 for the isotope mixture to be separated, to which the supplemental gas may also have been admixed. The mixture from supply tank 1 enters the mixing chamber 3 via the nozzle 31. The supply tank 2 contains the reaction partner, i.e., hydrogen iodide, which likewise gets into the mixing chamber 3 via the nozzles 32. The nozzles may be designed with a multiplicity of individual nozzles, and also an annular slit nozzle. The entering gases, which are heavily undercooled by their adiabatic expansion, are mixed in the mixing chamber 3. By adjusting the pressures in the supply tanks and in the mixing chamber 3 as well as by an appropriate design of the nozzles, care is taken that the velocity of the partial gas streams in the mixing chamber in approximately the same or at least not so different that the relative velocity between the reaction partners leads to undesired, i.e., non-selective reactions to a detrimental degree during the mixing process.

Inside the treatment chamber 35, the particle stream of mixed gases flows subsequently in contact with slowly revolving cylinders 5 held at a low temperature and the stream is precipitated there as a solid layer 51. The temperature of the layer is set so low by cooling the cylinders to, for instance, 20K., that the subsequent irradiation allows selective excitation. The coolant, not shown, must remove the kinetic energy of the particle stream converted into heat as well as the heat of condensation. The layer of solid matter is moved by the rotation of the cylinders to come under the influence of a laser beam 4, which is adjusted, particularly with respect to the direction of incidence of the laser radiation, so that the radiation penetrates the layer on the entire covered length of the cylinder. The speed of rotation of the cylinders is adjusted so that the thickness of the layer grown per revolution is just large enough that on the one hand, the molecules located at the inner boundary of this layer of the one isotope are excited with sufficient probability, but that on the other hand, the absorbed portion of the radiation is maximized. To achieve this, it is advantageous to make the surface of the cylinders highly reflecting. This radiation excites the one isotope compound selectively and thereby, a selective chemical reaction is triggered with the reaction partner, i.e. hydrogen iodide, so that now, the original isotope is no longer present in the same compound form but is converted to a different form.

The chemical conversion due to the laser irradiation proceeds in this example according to the following equation:

$$UF_6 + HI \rightarrow UF_5 = HF + I.$$

The excited uranium isotope, for instance U 235, which reacts with HI, is then present in the compound form $UF_5$. $UF_5$ is a solid substance which evaporates at substantially higher temperatures than $UF_6$.

The layer 51 converted in this manner is subsequently stripped off mechanically via a scraper 52 and drops to the bottom of the container in powder form. This container bottom is closed off via a vacuum gate valve 61.

Below this vacuum gate valve 61 there is a vacuum chamber 6, into which the solid powder 51 can blow by opening the gatevalve 61. Chamber 6 containing solid powder 51 can be used for carrying out a fractional distillation. To carry out this process, two capacitor electrodes 62 are provided, which are connected to a high-frequency generator, not shown. When this generator is switched on, practically uniform heating of the powder 51 located between the electrodes takes place. Thereby, the reaction partner hydrogen iodide and the reaction product HF evaporate off first at a temperature of about 170K., and pass via the exhaust line 74 and 75 as well as the pump 66 to a collecting tank 67. A separator 63 is provided in line 74 for $UF_6$ and $UF_5$ that have been carried along with the HI and HF leaving chamber 6 through line H. These two substances i.e. $UF_6$ and $UF_5$, evaporate at substantially higher temperatures than HI and HF, so that during the evaporation of HI and HF the amount of $UF_6$ is small and no adverse reactions affecting the selectivity of the chemical conversion occurs.

The separation proper of the $UF_6$ isotope mixture from the $UF_5$ which contains predominantly only one uranium isotope, and iodine is accomplished on the basis of the large differences in vapor pressure of these substances by pumping off the $UF_6$ and $I_2$ from the spaces 73 and 63 at higher temperatures then recondensing them. $UF_6$ can be removed at a temperature of 250K. from the tanks 73 and 64 and recondensed in the tank 64. $I_2$ can be removed at a temperature of 310K. from the tanks 73 and 63 and recondensed in the tank 65. The tanks 64 and 65 are at temperatures of approximately 190K.

The enriched uranium which remained in the tanks 73 and 63 and is present in the form of $UF_5$, can now be removed by conversion into $UF_6$ by means of $F_2$ from the supply tank 76 and condensation thereof in the tank 77 or by pumping off.

The condensation cylinders 5 are impinged or acted upon, in the apparatus of FIG. 1, by the particle jet or stream from the nozzles 31 and 32 with a very high velocity, in which process the kinetic energy is converted of necessity into thermal energy. The latter must be removed by appropriate cooling of the cylinders 5. In the last analysis, this means additional energy consumption and costs for the refrigeration machines. To reduce them, reference is made to a second device shown in detail schematically in FIG. 2.

Figure 3:
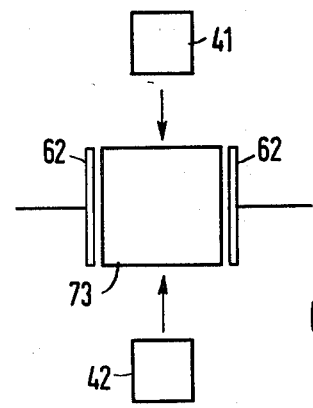
FIG. 3 illustrates two laser devices irradiating solid matter condensate in a chamber.

The basic change of this device from that from FIG. 1 is that the discharge nozzles 31 and 32 are no longer arranged in an immovable tank wall, but at the end face of a rapidly rotating constant-stress disc 33. The nozzles 31 and 32 are arranged so that the gas jets leave tangentially and accelerate the disc 33 by the reaction forces caused thereby, or hold it at a very high speed of rotation. The electric motor 50 can aid this motion or, acting as a generator, brake it and can thereby be used for controlling and, through measurement of the current consumed or delivered, or of the voltage, for monitoring the rotation. In the steady-state condition, the speed of rotation becomes so high that the relative velocity between the particle jets and the wall of the housing 35a is now very small and no substantial amount of kinetic energy is converted into heat any more upon striking the cooled collecting wall 54. Wall 54 is of approximately U-shaped cross section and is mounted in the housing 35a by means of supports 39, so that the cooling thereof either becomes unnecessary or can at least be kept relatively low as compared with FIG. 1. The condensation products formed in the gas space are flung against the wall 54 and form a coating 51, which is removed by the scraper 55, which can be turned slowly via the shaft 56. The condensation products are transported via an opening 57 into a combined irradiation and separation arrangement. The latter consists of a housing 7, which is subdivided by a center partition 78 into two chambers. Each chamber in turn can be closed off from the treatment room or the filling opening 57 by a vacuum gate valve 72. A hinged flap 71 takes care that the condensate 51 dripping down from the opening 57 gets either into the one or the other chamber. In the condition shown in FIG. 2, the left-hand chamber is being filled and the right-hand chamber is closed off vacuum-tight by the slide 72. The condensate enters the space between two capacitor electrodes 62 which are connected, as in FIG. 1, to a high-frequency generator, not shown. In the right-hand chamber, the space between the two electrodes 62 is completely filled with the condensate 51. In the direction perpendicular to the plane of the drawing, two laser devices 41 and 42 are provided, as shown in FIG. 3, which now radiate into the "capacitor filling" 51, so that thereby, selective excitation of the one isotope compound as well as the chemical reaction with the reaction partner, which is made possible thereby, now takes place. The power of the laser radiation source as well as the cross section and the shape of the layer of the particles 51, which is to be irradiated-through, are matched so that approximately uniform radiation absorption is achieved over the entire cross section of the filling 51. For this purpose and to better utilize the radiation, which is scattered diffusely by the crystal bed, it is advantageous, for instance, to make the inside surfaces of the tank 73 reflecting and to provide only narrow windows for admitting the radiation. Subsequently, i.e. after this irradiation, the high-frequency generator, not shown, is switched on, so that now the fractional distillation takes place. The distillation products are removed in the same manner as in the example according to FIG. 1 for further fractional condensation, and are collected separately.

After changing the hinged flap 71 and opening the vacuum slide 72, the other tank 73 is filled with the condensate 51 from the opening 57. Thereupon, the right-hand chamber is closed by the vacuum slide 72, the condensate 51 contained between the electrodes 62 is irradiated as per FIG. 3 and the substances contained therein are separated as described above.

The isotope mixture and the reaction partner are fed from the supply tanks 1 and 2 via a hollow shaft 34 which is supported, in ball bearings 36, and via canals in the disc 33. Sealing lips 37 are provided, so that a clean separation of the supplied isotope mixture and the reaction partner are ensured prior to their confluence or their emergence from the rotating nozzles 31 and 32. The drive motor, which is provided, among other things, for starting the rotating nozzles, may be constructed, as shown here, as a so-called canned or jacketed motor 50, with the housing wall 35a at that point, made substantially thinner than the normal wall thickness. The rotor parts are mounted on the shaft 34 opposite the external field windings 40 which surround the area of the housing wall 35a. This motor can be constructed as a synchronous motor or also as an asynchronous motor. A turbine drive may also be provided instead of this drive. However, as the design of these drive elements has no influence on the separation process proper, a description of further details pertaining thereto is dispensed with.

If the shaft 34 is supported in correspondingly low-friction bearings, such as gas bearings, magnetic bearings, etc., a separate drive can be dispensed with. The reaction forces of the gas streams leaving the nozzzles bring the disc 33 to such a speed that the impingment velocity of the particles on the collecting wall 54 is so small that the required cooling power is not very large. For this reason, apparatus constructed in accordance with these principles is suitable also for other technical purposes, for instance, for gas liquefication.

With respect to irradiation of the solid particles for the excitation of the isotope, methods known in the art can be used. Reference should be made especially by multiquanta absorption by short light pulses, and likewise to carrying out a two-stage process, in which the irradiation takes place, for instance, in the first stage with the $3_{v3}$—vibration and in the second stage simultaneously with a corresponding UV vibration. The wave number $3_{v3}$ is at 1873 cm$^{-1}$ for UF$_6$ and that of a suitable UV radiation at about 30,000 cm$^{-1}$.

As the supplemental gas is used merely as an aid for improving the adiabatic expansion but does otherwise not participate in the chemical reaction, its addition can be dispensed with for those substances which already have a sufficiently large adiabatic coefficient.

There is claimed:

1. In a method for the separation of an isotope substance from a vaporous mixture of isotope substances, by selective excitation at low temperatures of one isotope compound by electromagnetic radiation having a wavelength and energy density to effect a chemical reaction between the excited one isotope compound and an added reaction partner to produce a reaction product the improvement comprising:
 (a) adiabatically expanding a body of the vaporous mixture of isotope compounds separate from the vaporous reaction partner to cool the mixture of isotope compounds to a temperature below 100K.,
 (b) adiabatically expanding a body of vaporous reaction partner in excess of that required for reaction with the excited isotope compound, separate from the vaporous mixture of isotope compounds to cool the vaporous reaction partner to a temperature below 100K.,
 (c) mixing the cooled mixture of isotope compounds and the cooled reaction partner together in a zone at a temperature below 100K.,
 (d) condensing the reaction partner in the zone to form particles of solid matter, into which particles of the mixture of isotope compounds are incorporated,
 (e) subjecting the solid matter of reaction partner and mixture of isotope compounds to electromagnetic radiation to selectively excite the one isotope compound and effect selective reaction of the excited isotope compound with the condensed reaction partner to produce a reaction product which contains predominantly the one isotope, and
 (f) separating a compound of the one isotope from the reaction mixture.

2. Method according to claim 1, wherein condensation to form particles of solid matter in the zone is effected at cooled surfaces in the zone.

3. Method according to claim 1, wherein the particles of solid matter and incorporated material is transferred to an irradiation chamber which is separate from the condensing zone, and the one isotope compound is excited and reacted with the reaction partner in the irradiation chamber, and the resultant reaction mixture is subjected to fractional distillation to separate a compound of the one isotope.

4. Method according to claim 3, wherein the particles of solid matter and incorporated material at its low temperature are pressed into a more compact body prior to being transferred, and then transferred to the irradiation chamber.

5. Method according to claims 1, 2, 3 or 4, wherein the vaporous mixture of isotope compounds is a mixture of uranium hexafluoride isotopes.

6. Method according to claim 1, wherein the vaporous mixture of isotope compounds is a mixture of UF$_6$ isotopes, and wherein the molar mixing ratio of UF$_6$ to the reaction partner is 1:1 to 1:100.

7. Method according to claim 6, wherein a supplemental gas increasing the adiabatic coefficient is added to the UF$_6$ in the molar mixing ratio 1:1 to 1:10.

8. Method according to claims 1, 2, 3, 4 or 6, wherein the reaction partner is selected from the group consisting of hydrogen bromide and hydrogen iodide.

* * * * *